United States Patent [19]

Andersson et al.

[11] Patent Number: 5,247,379

[45] Date of Patent: Sep. 21, 1993

[54] CHIRAL NEMATIC LIQUID CRYSTAL DEVICE WITH LINEAR ELECTROCLINIC EFFECT

[75] Inventors: Gunnar Andersson; Lachezar Komitov; Sven T. Lagerwall; Bengt Stebler, all of Göteborg; Kurt Flatischler, Borås, all of Sweden

[73] Assignee: S. T. Lagerwall S.A.R.L., Bandol, France

[21] Appl. No.: 885,285

[22] PCT Filed: Feb. 15, 1990

[86] PCT No.: PCT/SE90/00101

§ 371 Date: Dec. 12, 1990

§ 102(e) Date: Dec. 12, 1990

[87] PCT Pub. No.: WO90/09613

PCT Pub. Date: Aug. 23, 1990

Related U.S. Application Data

[63] Continuation of Ser. No. 585,051, Dec. 12, 1990, abandoned.

[30] Foreign Application Priority Data

Feb. 16, 1989 [SE] Sweden .................. 8900562
Mar. 6, 1989 [SE] Sweden .................. 8900777

[51] Int. Cl.$^5$ ............................. G02F 1/133
[52] U.S. Cl. .......................... 359/90; 359/76; 359/77; 359/78; 359/91; 359/102; 359/100
[58] Field of Search ............ 350/346, 347 E, 340, 350/341, 350 S, 347 R; 359/75, 76, 78, 84, 90, 91, 99, 101, 102, 77

[56] References Cited

U.S. PATENT DOCUMENTS

| | | | |
|---|---|---|---|
| 4,469,408 | 9/1984 | Krüger et al. | 359/75 |
| 4,577,930 | 3/1986 | Yang | 359/76 |
| 4,838,663 | 6/1989 | Lagerwall et al. | 350/341 |
| 4,882,207 | 11/1989 | Coates et al. | 350/341 |
| 4,892,392 | 1/1990 | Broer | 350/341 |
| 4,917,475 | 4/1990 | Meyer et al. | 350/346 |
| 4,927,244 | 5/1990 | Bahr et al. | 350/347 E |
| 5,116,527 | 5/1992 | Coates et al. | 359/76 |

FOREIGN PATENT DOCUMENTS

0219479 4/1987 European Pat. Off. .......... 350/350 S
3711360 10/1988 Fed. Rep. of Germany .

OTHER PUBLICATIONS

"Linear Electroclinic Effect in a Chiral Nematic Liquid Crystal", *Physical Review Letters*, vol. 62, No. 7, Feb. 1989 (New York) Zili Li et al. pp. 796–799.

Madhusudana et al.–"Linear Flexo-Electro-Optic Effect in a Hybrid Aligned Nematic Liquid Crystal Cell" J. Physique Letter 46(1985)–pp. L195–L200.

Geary–"A Multiplexed Ferroelectric LCD Using AC Field Stabilized States", SID Digest—1985—pp. 128–130.

Fergason–"Performance of A Matrix Display Using Surface Mode" IEEE Biennial Display Research Conference—1980—pp. 177–179.

Garoff et al. "Electroclinic Effect at the A-C Phase Change in a Chiral Smectic Liquid Crystal" Physical Review Letters—vol. 38—No. 15—1977—pp. 848–851.

*Primary Examiner*—William L. Sikes
*Assistant Examiner*—Tai V. Duong
*Attorney, Agent, or Firm*—Young & Thompson

[57] ABSTRACT

An electro-optical device including a chiral nematic liquid crystal disposed between flat plates treated to weakly enforce molecular orientation along one preferred direction parallel to the plates. The plates are spaced by a distance small compared to the pitch of the helix typical in a bulk of the material, or the helix compensated by additives to ensure the equivalent situation. By an externally applied electric field the liquid crystal molecular orientation is rotated in a plane parallel to the plates away from the preferred orientation an angle the sign and size of which depends on the sign and magnitude of the field. The optical axis of the liquid crystal, oriented along the molecular orientation, is thus controlled by the external electric field in such a way as to make a linear light valve or other electro-optical device.

5 Claims, 4 Drawing Sheets

CHIRAL NEMATIC LIQUID CRYSTAL DEVICE WITH LINEAR ELECTROCLINIC EFFECT

This application is a continuation of application Ser. No. 07/585,051, filed Dec. 12, 1990, now abandoned.

BACKGROUND AND DESCRIPTION OF PRIOR ART

Conventional liquid crystal devices, as exemplified by twisted nematic or supertwist nematic devices, utilize a quadratic electrooptic effect, i.e. an effect sensitive to the magnitude but not to the sign of an applied electric field. The response of the liquid crystal material to the external field is, in this case, of dielectric nature, and the decisive material parameter is the dielectric anisotropy, that is, the difference between the value of the dielectric constant along the long molecular axis and the value perpendicular to that axis, which is also the optic axis. According to whether this anisotropy is positive or negative, an applied electric field will have the tendency to align the material in such a way that the optic axis is along or perpendicular to the field, respectively. According to its nature, this response increases proportional to $E^2$, the square of the applied field.

Since about a decade a radically different liquid crystal technology is growing based on ferroelectric liquid crystals, first described by R. B. Meyer et al. in Journal de Physique, volume 36, pages L69 to L71, 1975. The first ferroelectric liquid crystal patent described the so-called surface-stabilized ferroelectric liquid crystal (SSFLC) and was filed by N. A. Clark and S. T. Lagerwall in 1980 and issued in 1983 as U.S. Pat. No. 4,367,924. The corresponding first announcement of high speed liquid crystal devices was made by the same authors in Applied Physics Letters, volume 36, pages 899 to 901, 1980. In these devices which are characterized by microsecond or submicrosecond speed, and by the completely new feature of symmetric bistability, the active electro-optic effect is a linear one, i.e. sensitive to the sign of the field. Whereas in a twisted nematic device the two distinct optical states are characterized by the field being ON or OFF, the SSFLC device can be driven between its two distinct states by changing the sign of the applied electric field.

Later linearly responding devices without bistability were described by Lagerwall et al. in U.S. Pat. No. 4,838,663, filed in 1987. The devices use different liquid crystal phases, being orthogonal smectics rather than tilted smectics used in the ferroelectric devices. These paraelectric phases, similar to the solid crystal case, typically exhibit a so-called soft mode, which is detectable as a pretransitional effect immediately before entering the ferroelectric phase. In the liquid crystal case such an effect was described first by S. Garoff and R. B. Meyer in Physical Review Letters, volume 38, page 848, from 1977 and they coined the word electroclinic for the response. This response means that the molecular axis ñ, which is also the optic axis, rotates a certain angle $\theta$ when an electric field is applied perpendicular to ñ, cf. FIG. 1. When the field direction is inversed, the induced tilt angle is in the opposite sense. The induced tilt $\theta$ is proportional to $\vec{E}$, but in the case of Garoff et al., so small that it requires phase sensitive methods for even being detected. In U.S. Pat. No. 4,838,663, which uses a different geometric configuration and explores a different temperature regime, the induced tilt is orders of magnitude larger and the effect is also distinguished by the fact that the response time is independent of the applied field, which makes the field an excellent control variable for $\theta$ and thereby for a grey scale in devices up to very high frequencies.

Recently it has been discovered that the electroclinic effect can be detected not only in the orthogonal smectic phase, but also in the higher-laying nematic phase, that is in the very opposite regime to that investigated by Garoff et al. This was first reported by one of the authors (Komitov) at the International Conference on Optics and Interfaces in Liquid Crystals, held in Torino, Oct. 14–20, 1988; cf. FIG. 2. Independently, the same finding was reported by Z. Li, R. Petschek and C. Rosenblatt in the Physical Review Letters, volume 62, pages 796 to 799, 1989. Although the induced tilt is larger in both these cases as compared with the Garoff et al. case, it is still by far too small to be useful in any practical device, being of the order of $10^{-2}$ degrees. In order to apply the electroclinic effect to any nematic device, the response has to be amplified by at least two orders of magnitude. In recognizing that, for its utilizability, the phenomenon depends on surface control, we have been able to find means to make it useful for device applications.

DESCRIPTION OF DEVICE PRINCIPLE AND EMBODIMENTS

Figure 3:
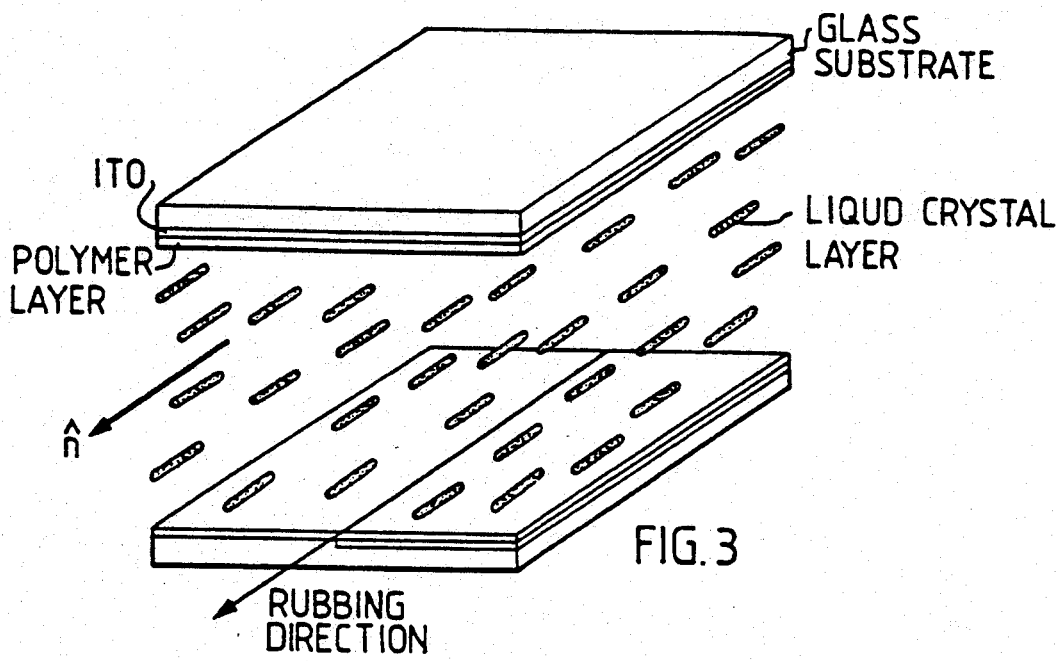
FIG. 3 is the same cell as in FIG. 1, now illustrating details of plate treatment like deposited conducting layers (here ITO) and molecule orienting layers (here a polymer), the latter being rubbed to ensure a preferred direction of the molecules' orientation equal to the coupled optic axis ñ at zero electric field.

To induce the electroclinic effect in a nematic liquid crystal the following conditions have to be satisfied. First the material has to be chiral, i.e. lacking reflection symmetry. The chiral nematic (N*) must further be characterized by having its (naturally occurring) helix unwound. It is thus a non-helical chiral nematic, also called an infinite-pitch chiral nematic. Such a chiral nematic can also be called pitch-compensated. Pitch compensation is achieved, e.g., by doping or mixing N* with soluble chiral substances until the helix vanishes. For practical purposes a vanishing helix means that the actual pitch or periodicity p has to be much larger than the cell gap d. Finally the optic axis has to be aligned by surface action from the bounding surfaces so that a non-ambiguous direction ñ is imposed everywhere in the bulk. Such an alignment can, for instance, be achieved by coating the glass plates adjacent to the liquid crystal with a polymer layer which is then rubbed along one direction that will in the filled cell define the ñ direction, cf. FIG. 3. This may sound as a trivial statement because this is the conventional method of aligning liquid crystals. However, the important difference between the electroclinic effect in the smectic A* phase and in the nematic N* phase is that in the smectic there is a thermodynamic bulk torque restoring the optic axis to the zero field direction. In the nematic phase there is no such restoring or counteracting torque because there is no intrinsic zero direction. Therefore both these features have to be supplied from the surfaces. By incorrectly attributing the response to a pure bulk effect, Li et al also deprive themselves of the possibility of influencing the magnitude of the effect. However, by diminishing the counteracting torque, the response can be magnified by orders of magnitude. This is done by, generally speaking, loosening the anchoring conditions as much as possible while still letting the weak anchoring define a preferred (zero field) direction in the bulk of the material.

A certain exception to this case is given by polymer chiral nematic phases because once the main polymer is aligned the backbone will serve to define a kind of internal direction given without reference to further boundaries.

Figure 1:
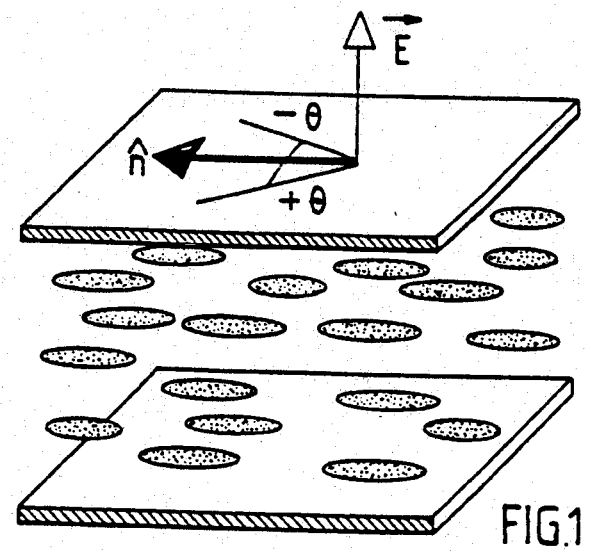
FIG. 1 is a view of the nematic liquid crystal in planar orientation contained between the confining glass plates, the long axes of molecules lying along the preferred (electric field E=0) direction. ñ describes the molecular orientation, $\pm\theta$ is the ñ position at fields $E \neq 0$.
Figure 2:
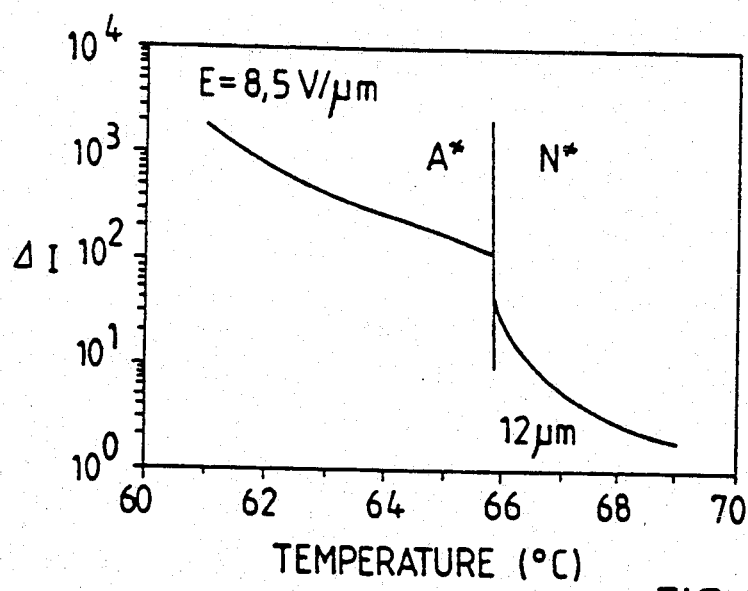
FIG. 2 is taken from the first presentation of an electroclinic effect in the nematic phase (Komitov et.al., Torino 1988), the figure showing the optical response (the amplitude of the light intensity modulation $\Delta I$) in the A* and N* phases of ZLI-3488 (by Merck) versus temperature for cells of thickness 12 $\mu$m at constant applied field strength E.
Figure 4:
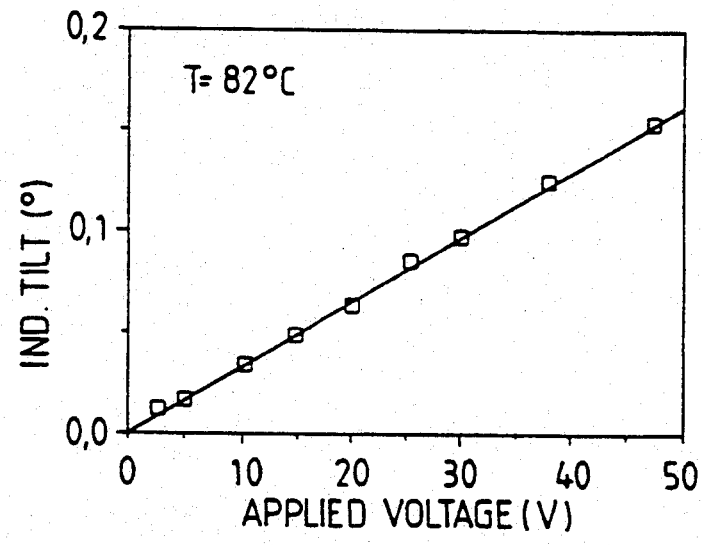
FIG. 4 shows the induced molecular orientation deviation $\theta$ from the preferred (zero field) direction, as a function of applied voltage at 82° C., in the compound 4-(9S, 3S, epoxyhexyloxy) phenyl-4'-decyloxybensoate.
Figure 5:
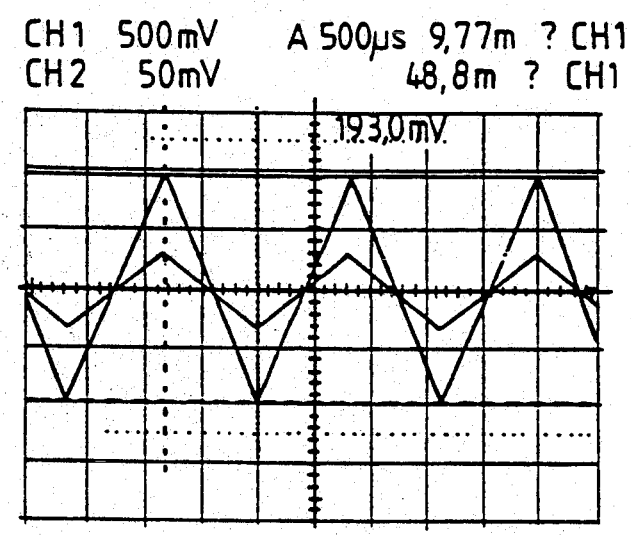
FIG. 5 is the simultaneous oscilloscope registration of the optical response (large amplitude curve) and the applied electric field (small amplitude curve in the compound of FIG. 4, both figures thus illustrating the linear dependence of response on field (arbitrary units).

If, under these conditions, an electric field $\vec{E}$ is applied across the liquid crystal film, i.e. perpendicular to ñ, or more or less so, i.e. the field must have at least some component perpendicular to ñ, then the optic axis will swing out perpendicular to both ñ and $\vec{E}$ either counter- or clockwise (cf. FIG. 1). The angular swing $\theta$ is proportional to the applied voltage for not too large deflections $\theta$. Different demonstrations of the linearity of the response are given in the FIGS. 4 and 5.

The soft boundary conditions can be achieved in the following ways. The glass plates including deposited electrodes are first coated with suitable aligning layers (e.g. polyimide, polyamide etc), whereafter these are treated to ensure a preferred direction of the molecular alignment (e.g. by rubbing), followed by further treatment to ensure softening of the torsional anchoring (i.e. the restoring torque from $\pm\theta$ back to the preferred direction). The latter is achieved e.g. by further covering the aligning layer with a liquid crystal (nematic, yet isotropic at the working temperature range of the cell), or with a different material leading to the same desired softening.

A different way to achieve the soft condition is by coating one or both surfaces with an agent provoking the homeotropic boundary condition, i.e. one in which the molecules align perpendicular to the bounding surface. Examples of such agents are lecithin or quilon. Before treatment with lecithin or quilon one or both surfaces may be treated for obtaining unidirectional alignment, by buffing, or by oblique evaporation of for instance SiO. If the dielectric anisotropy of the chiral nematic liquid crystal is negative, the same alignment condition as before can be obtained by applying a holding field to the sample, for instance of 100 kHz frequency. In this case the optic axis turns parallel to the plates, except in a very thin boundary layer near the surface, and extremely weak directional preferences in the surface are sufficient to sort out the zero direction parallel to the plates. In fact no previous treatment for unidirectional alignment may be necessary as already the action of filling the cell in the isotropic phase is usually sufficient for this.

Figure 6:
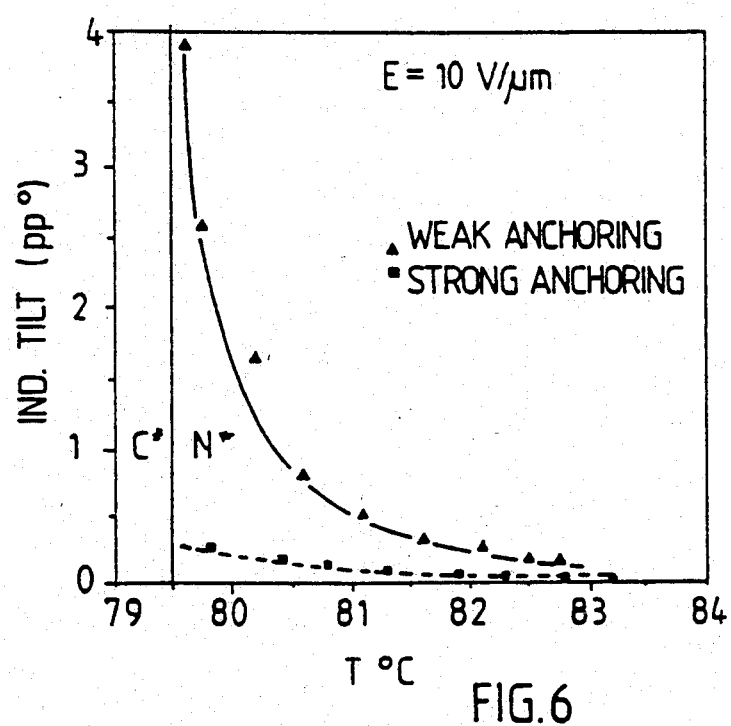
FIG. 6 shows the induced tilt in the case of the compound of FIG. 4, illustrating the role played by weakening the anchoring conditions. Here, the softer version was achieved by pretreating the surface with $SiO_2$, followed by buffing and subsequent deposition of MBBA, that is in its isotropic phase at the working temperature range of the cell.
Figure 7:
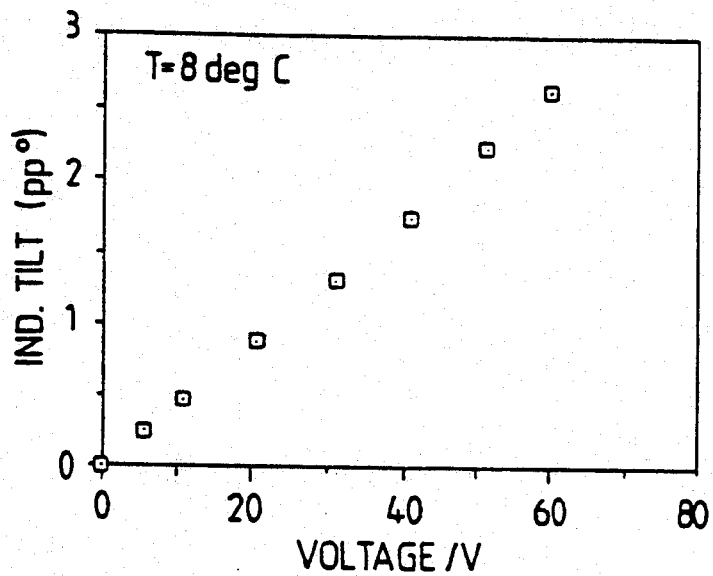
FIG. 7 shows the induced tilt as a function of applied voltage, in the case of soft boundary condition (material and conditions as in FIG. 6)
Figure 8:
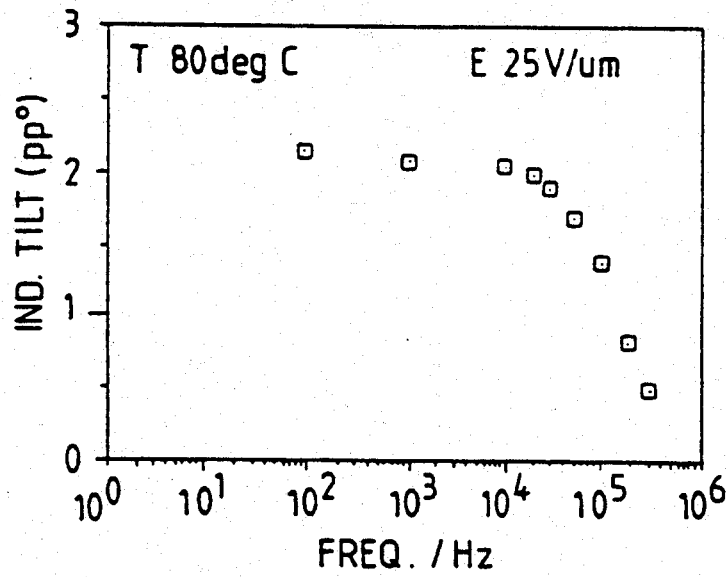
FIG. 8 is the frequency characteristic of the soft boundary condition case, corresponding to FIGS. 6 and 7.

An example of the induced tilt and its linearity in the case of soft (weak anchoring) boundary conditions is shown in FIGS. 6 and 7, respectively (in FIG. 6, for comparison, the induced tilt is also shown in a stronger anchoring case). The corresponding frequency characteristic is shown in FIG. 8.

Near the N*-A* or N*-C* transition temperature the nematic cell can be switched in a different electro-optic mode. As the field is increased it may induce the transition to the A* or C* phase. By this transition the electro-optic effect is enhanced considerably. Usually applied fields of the order of 30 volts/$\mu$m are sufficient to induce these transitions.

In the previous section we pointed out that in the A* phase as in all smectic phases, there is a restoring thermodynamic torque which is an intrinsic property of the bulk. The absence of this torque in the N* phase can be utilized to give the N* device a certain capacity of being multiplexed. Whereas in the A* phase the relaxation back to the initial state is as rapid as the active switching, in the nematic case only the wellknown weak nematic torque is active when the field is taken off. This means that a number of lines in a matrix may be written before any noticeable degradation of the written information can be perceived.

We claim:

1. A device comprising a chiral nematic liquid crystal material (N*) between electroded glassplate surfaces, N* being characterized by infinite pitch or very long pitch of its helical periodicity, said liquid crystal material having molecules and a director being aligned parallel to the glassplate surfaces, whereby an electric field E with a component perpendicular to the director induces a rotation of the director by an angle $\theta$, where $\theta$ is proportional to the applied field E, said induced rotation being amplified by providing weak anchoring conditions to the molecules by the surfaces and where the applied electric field E induces the transition N*→A* or N*→C* or N*→A*→C*.

2. A device comprising a chiral nematic liquid crystal material (N*) between electroded glassplate surfaces, N* being characterized by infinite pitch or very long pitch of its helical periodicity, said liquid crystal material having molecules and a director being aligned parallel to the glassplate surfaces, whereby an electric field E with a component perpendicular to the director induces a rotation of the director by an angle $\theta$, where $\theta$ is proportional to the applied field E, said induced rotation being amplified by providing soft anchoring conditions to the molecules by the surfaces, said soft anchoring conditions having been brought about by coating at least one of the surfaces with a different nematic which is isotropic at the operating temperature of the device.

3. A device as claimed in claim 2, wherein said chiral nematic liquid crystal material is a polymer liquid crystal.

4. A device comprising a chiral nematic liquid crystal material (N*) between electroded glassplate surfaces, N* being characterized by infinite pitch or very long pitch of its helical periodicity, said liquid crystal material having molecules and a director being aligned parallel to the glassplate surfaces, whereby an electric field E with a component perpendicular to the director induces a rotation of the director by an angle $\theta$, where $\theta$ is proportional to the applied field E, said induced rotation being amplified by providing soft anchoring conditions to the molecules by the surfaces, said soft anchoring conditions having been brought about by coating at least one surface with a substance inducing a homeotropic condition, thereafter forcing the molecules out of this condition by the application of an AC-bias field, under condition that the molecules have a negative dielectric anisotropy.

5. A device as claimed in claim 4, wherein said chiral nematic liquid crystal material is a polymer liquid crystal.

* * * * *